Feb. 19, 1952 — W. N. TUTTLE — 2,586,397
SPEED CONTROL SYSTEM FOR ALTERNATING CURRENT MOTORS
Filed July 8, 1946
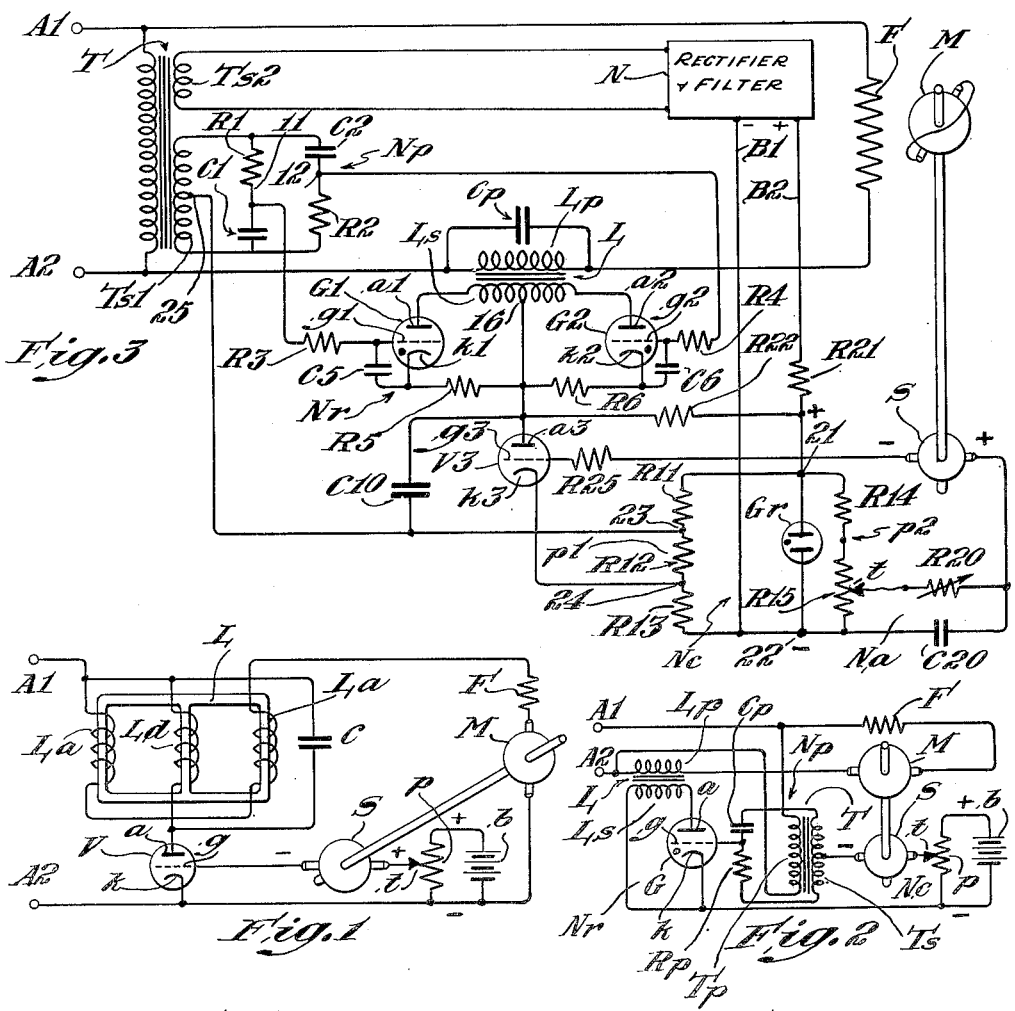
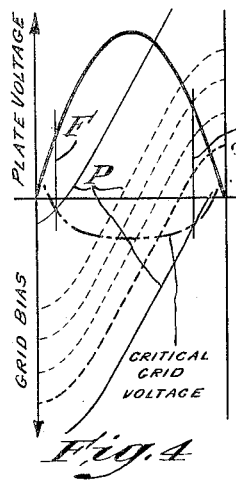
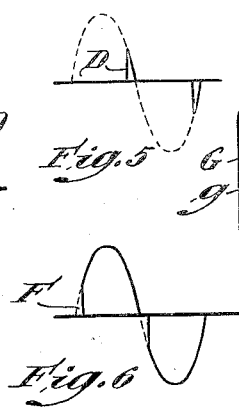
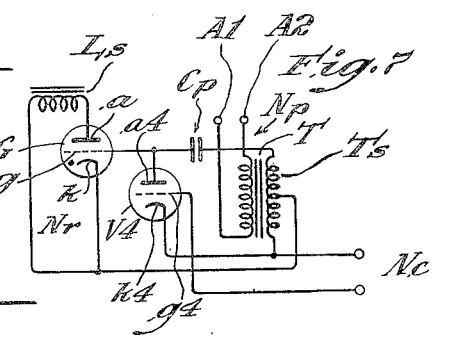
Inventor
William N. Tuttle
By Robert, Cushman & Grover
att'ys.

Patented Feb. 19, 1952

2,586,397

UNITED STATES PATENT OFFICE 2,586,397

SPEED CONTROL SYSTEM FOR ALTERNATING CURRENT MOTORS

William N. Tuttle, Concord, Mass., assignor to General Radio Company, Cambridge, Mass., a corporation of Massachusetts Application July 8, 1946, Serial No. 681,814

12 Claims. (Cl. 318—229)

1

The present invention relates to speed control systems, and more particularly to electronically controlled systems for regulating and controlling the speed of alternating-current motors.

The systems at the present time most widely used for regulating and controlling the speed of motors running on alternating-current supply lines employ direct-current motors with separate rectifying and control circuits for the field and armature windings. Such systems can be designed to furnish satisfactory control characteristics for most applications, but require a comparatively large number of electronic tubes and auxiliary circuit devices which easily become sources of failure. These conventional systems further do not permit satisfactory control at very low speeds, and operate with an unfavorable form factor of the energizing current causing unfavorable heating characteristics which result in poor efficiency.

Some of the principal objects of the present invention are to provide a system for regulating and controlling the speed of motors operating on an alternating-current supply network, which permits the use of alternating-current rather than direct-current type motors, to provide such a system which operates with a minimum distortion of the energizing alternating-current wave under maximum load conditions when such undistorted operation is most desirable, to provide such a system which requires a minimum of electronic and auxiliary circuit elements, in a simple embodiment for example a single discharge device, and to provide such a system which regulates, with varying loads, its speed within very narrow limits of variation, and which permits exact control and adjustment of the automatically maintained speed of its motor with very simple means carrying only comparatively low regulating and control currents and voltages.

Other objects of the invention are to provide a motor control system which permits speed regulation at speeds between, and speed control within ranges such as from 30 to 3600 R. P. M., which, due to its inherent characteristics, does not require anti-hunting provisions, which permits control of the rate of speed regulation or speed change by simple acceleration control means, and to provide a system of the above indicated type which is simple, rugged, accurate and reliable in operation, and comparatively inexpensive.

In one of its aspects, the system according to the present invention attains the above mentioned objects by supplying an alternating-current motor of the type wherein the motor speed

2 is a function of the energy supplied thereto, from an alternating-current supply line containing a reactor whose impedance can be varied by means of a voltage generator that is controlled by the motor to furnish an auxiliary voltage proportionate to its speed (for example a tachometer generator coupled to the motor), a network including an electron discharge device whose input circuit is affected by the voltage derived from the speed measuring generator controlling, through the output circuit of the discharge device, the reactor impedance as a function of the auxiliary voltage, so that the energy supplied to the motor is varied inversely proportionate to its speed. According to another aspect of the invention, an arbitrarily selected constant voltage is combined with the regulating voltage furnished by the auxiliary generator, the constant voltage being used for setting or controlling the speed of the motor which the system then automatically regulates to a constant value. The arbitrarily selected constant voltage can be employed to determine the motor speed by combining it with the voltage furnished by the auxiliary generator in opposition thereto, and by applying the difference between the two voltages to the input circuit of an electron discharge device which controls the energy supplied to the motor. The sensitivity of the system can be so selected that only a relatively small difference between these two voltages is required to effect control, with the motor speed such that the voltage of the auxiliary generator becomes approximately equal to the selected constant voltage. The constant voltage thus determines the speed and a voltage divider providing this voltage can be calibrated directly in terms of speed. Yet another feature of the invention is the possibility of controlling the rate of regulation (acceleration) of the motor speed changes, due to regulation or control, by means of a timing network inserted in the control circuit for the above mentioned device for varying the energy supplied to the motor.

The above mentioned control of the impedance of the series reactor may be accomplished by adjusting it continuously for example with the aid of saturable core and an electron discharge tube whose conductivity controls the saturation of the core and which is in turn controlled by the above mentioned voltage difference.

In a further aspect of the invention, this impedance control of the series reactor takes place within each half cycle, either of a unidirectional half cycle series or during each half cycle of an alternating-current wave, the impedance of the series reactance, while normally of considerable value, being decreased at a selected point of the cycle so that only varying portions of the cyclic energy are admitted to the motor, thereby varying its speed. This variation of impedance of the series reactor may be accomplished by means of an electron discharge device in a shunting connection of a control winding inductively coupled to the series reactance; the discharge device is controlled by the regulating voltage derived from the auxiliary generator (if desired adjustably opposed by the above mentioned arbitrarily chosen control voltage), thus rendering the discharge device conductive at a selected point of the alternating-current cycle and changing the impedance value of the series reactor at that point. The electron discharge device in the above mentioned shunting connection may be a gaseous discharge tube of any suitable type whose firing point is determined by a phase shifting network which is in turn controlled by either or both above mentioned control and regulating voltages, respectively derived from the auxiliary voltage source such as a tachometer generator, and an arbitrarily adjustable control voltage. The control and regulating voltages may be directly superimposed upon the potential of the phase shifting network, or they may be used for adjusting the phase of that network.

Additional features of the arrangement according to the present invention are circuit arrangements for utilizing, within a reactor control system of the above mentioned type, both half waves of an alternating-current by means of inversely connected thermionic gaseous discharge tubes whose control electrode voltages are regulated by a high vacuum tube system which is in turn supervised by the regulating and control voltages derived from the tachometer generator coupled to the motor and from an adjustable source of a direct voltage.

These and other objects, aspects and features will appear from the following description of several typical, practical embodiments illustrating the novel characteristics of my invention. This description refers to a drawing in which Fig. 1 is the circuit diagram of an embodiment employing a single high vacuum electron discharge tube;

Fig. 2 is the circuit diagram of a second embodiment employing a gas filled electron discharge tube;

Fig. 3 is the circuit diagram of a third embodiment which permits particularly efficient and accurate speed regulation and control;

Figs. 4 to 6 are diagrams illustrating the operation of systems according to the invention; and Fig. 7 is the circuit diagram of an embodiment according to Fig. 2, wherein the firing point of the regulating tube is adjusted by means of phase shift instead of superimposed direct voltage.

The first embodiment of the invention chosen for the purpose of illustrating some of its aspects is a comparatively simple motor control circuit which, as indicated in Fig. 1, is composed of a motor M having a field winding F, this motor being of the commutator type which permits speed regulation by means of affecting the alternating-current energy supplied to the motor. Such motors are for example straight commutator series motors or repulsion type motors. The supply circuit of the motor contains a variable reactor, for example of the three legged saturable core type, as indicated at L of Fig. 1. Windings $La$ are connected in series in line $A1$, and winding $Ld$ is connected across lines $A1$, $A2$ in series with the output circuit of a high vacuum tube V with anode $a$, cathode $k$ and control grid $g$. A condenser C is connected across direct-current winding $Ld$, for the purpose of maintaining the current flow through the winding $Ld$ during the half cycles of the supply current during which the tube V is not conducting.

Coupled to motor M is a tachometer generator S, in such a manner that its speed is equal to or proportionate to that of the motor. Fig. 1 indicates direct mechanical coupling, but it will be understood that any suitable means may be employed to co-relate the two dynamos for the purpose of providing an auxiliary voltage which is proportionate to the motor speed.

The tachometer generator S is connected between the grid $g$ of tube V, and tap $t$ of an auxiliary voltage source indicated in Fig. 1 by a battery $b$ and a potentiometer $p$.

The above described arrangement operates as follows:

With motor M running, the voltage developed by generator S is proportionate to the motor speed. The generator voltage is in opposition to the adjustable voltage supplied at tap $t$ by the battery $b$ and potentiometer $p$. When the tap $t$ is moved up from the negative end of the potentiometer $p$ to a position corresponding to the desired speed, the potentiometer voltage exceeds the generator voltage, the grid $g$ becomes positively biased, and the anode current of the tube V through the winding $Ld$ increases, saturating the reactor L so that substantially the entire line voltage is applied to the motor M. The motor speeds up and the negative voltage of the generator S correspondingly increases until the positive voltage from the potentiometer $p$ is neutralized. When this occurs the anode current of the tube V is sharply decreased, increasing the inductance of the reactor L and reducing the current through the motor M to a value just sufficient to maintain the desired speed. Since a small change in the potential of the grid $g$ can cause a large change in the current through the motor, equilibrium results at a speed for which the generator voltage is very closely equal to the potentiometer voltage. If a load is applied to the motor, the required increase in motor current can be provided by a relatively small change in the bias of the grid $g$. Only a slight decrease in the voltage of the generator S, corresponding to a relatively small decrease in the speed of the motor M, is required to produce this change in bias. The motor, therefore, has the characteristic of constant speed under varying load.

It will be understood that the construction and the dimensions of reactor L have to be selected, in accordance with well known principles, to co-relate its function to the characteristics of tube V, to the voltage developed by generator S, and to the auxiliary voltage applied through tap $t$.

The bias voltage at tap $t$ of potentiometer $p$, combined with the tachometer generator voltage controls the conductivity of tube V. Hence, adjustment of tap $t$ permits change of the tachometer voltage and consequently of the motor speed at which equilibrium is reached. The desired speed is determined by the setting of the tap $t$ which can therefore be calibrated directly in terms of speed. This control setting is then maintained by the above described regulating operation of the system.

As well known, saturation core reactors have the disadvantages of a comparatively low speed of response and of introducing harmonics into the load circuit which may be undesirable under certain conditions. The low speed of response tends to cause the system to hunt, as the motor may respond more rapidly than the control system to variations in voltage. These disadvantages are reduced, particularly under full load conditions, in the arrangement now to be described with reference to Fig. 2, which illustrates other aspects of the invention. In the system about to be described the response of the controlling system is effected within one half cycle of the alternating-current supply frequency and is consequently much more rapid than the response of the motor. The system is thus inherently stable and requires no special anti-hunting provisions. Also in the system about to be described the harmonics are reduced, particularly under full-load conditions, as will later be described more in detail.

In Fig. 2, A1, A2 is again an alternating-current supply line feeding a motor M with field winding F, of the above mentioned type. A variable reactor L, having a primary Lp and a secondary Ls, is contained in the motor supply line, with primary Lp connected between terminal A2 and motor M.

The secondary Ls is connected in regulating network Nr, in series to the anode a and the cathode k of a gas discharge tube G shown in Fig. 2 as of the thermionic type having a control electrode g. This gas-discharge tube may also be of the cold-cathode, ignition, magnetically-controlled or any other suitable type, with the control circuit correspondingly modified to permit the firing point to be determined by the direct voltage obtained from the tachometer S and the potentiometer p.

The motor M is again coupled to a tachometer generator S, in the manner described above with reference to Fig. 1. One output terminal of the generator is connected to adjustable tap t of potentiometer p through which the voltage of battery b can be apportioned. A phase shifting network Np includes a transformer T whose secondary Ts is with its midpoint connected to the other generator terminal, a condenser Cp, and a resistor Rp, elements Rp and Cp having values selected to provide a phase shift of approximately 90°. The conductor between Cp and Rp is connected to control electrode g of tube G. The primary Tp of transformer T is connected to supply terminals A1 and A2. The control circuit Nc is closed through a connection between a negative point of potentiometer p and cathode k.

The above described arrangement according to Fig. 2 operates as follows.

The phase shifting network Np applies to control electrode g alternating-current potentials whose nature is indicated by the family of curves P of Fig. 4, the phase shift of 90° between this auxiliary alternating-current and the main supply current being provided by the above described relation of resistor Rp and capacitor Cp. The sum of the phase shifted alternating voltage and the variable direct voltage from the generator and potentiometer is applied to the grid g of tube G so that the potential level of this auxiliary alternating-current wave depends upon the regulating direct voltage supplied by tachometer generator T and the controlling direct voltage derived from tap t. Depending upon the prevailing potential level of the auxiliary alternating-current wave P, thyratron G will fire at instants within the main alternating-current cycles which are defined by the intersections of cycles P with the critical grid voltage curve likewise indicated in Fig. 4, with the grid voltage scale magnified relatively to the plate voltage scale. Assuming for example that full load operation, at a selected speed, of motor M corresponds to the firing point indicated by line F of Fig. 4, thyratron G will be conductive through the larger portion of the main alternating-current cycle, to the right of F. During this portion of the cycle, secondary Ls of reactor L is effectively short circuited, so that the primary impedance of L falls and practically the entire line energy is admitted to the motor. If the load of motor M decreases, and its speed therefore increases, the voltage furnished by auxiliary generator S increases, the potential level of electrode g falls, the firing point of thyratron G moves towards the right hand side of Fig. 4, and the periods during which secondary Ls is short circuited become shorter, diminishing the energy supplied to motor M and hence limiting the increase in speed to a small practically insignificant value.

It will be seen that in this method of operation the variable reactor L is effective in the manner of a current transformer, the comparatively low current fluctuating in the secondary circuit through the electron discharge device flowing in magnified form directly through the motor.

It will also be evident that the speed of the motor M can be set by shifting tap t, in the manner described above with reference to Fig. 1.

As mentioned before, systems of the type described with reference to Fig. 2 do not require anti-hunting provisions since the speed control operates at the rate of the alternating-current frequency, whereas the speed of the motor changes at a much slower rate, so that hunting is inherently avoided and speed regulation and control are quite stable without the special anti-hunting devices required by other systems for similar purposes.

Arrangements of the type described with reference to Fig. 2 permit utilization of only half cycle waves; the modification now to be described with reference to Fig. 3 employs the entire alternating-current wave and incorporates additional features which, according to the invention, provide for particularly exact regulation and control of the speed of a motor.

In Fig. 3, A1 and A2 again denote an alternating current line which supplies exciting winding F of a repulsion motor M which is coupled to a tachometer generator S. A transformer T supplies, through secondary Ts1, a phase shifting network Np, including in parallel connection the resistor-capacitor units R1, C1, and R2, C2. The supply line A2 contains the primary Lp of reactor L which is bridged by a ripple suppressing capacitor Cp. The secondary Ls of reactor L is connected to a regulating network Nr as follows.

The regulating network Nr contains two thyratrons G1, and G2, whose anodes a1 and a2 are connected through the terminals of reactor secondary Ls. The grids g1 and g2 are connected, through limiting resistors R3 and R4, to points 11 and 12 respectively of the phase shifting network Np, from which two auxiliary alternating-current waves are derived which are 90° out of phase with the main supply current and whose phase relation is determined by resistors R1 and R2 and capacitors C1 and C2. The cathodes k1 and k2 are connected to each other and to midpoint 16 of secondary Ls, through load balancing resistors R5 and R6. By-pass condensers C5 and C6 are connected between grids and cathodes of thyratrons G1 and G2.

A control network Nc is supplied with direct-current, for example through secondary Ts2 and rectifier and filter network N. The voltage of net Nc may be kept substantially constant by a voltage regulator tube Gr or similar means. The direct-current voltage having the polarities indicated in Fig. 3 is at points 21 and 22 applied to two voltage dividers p1 and p2, with taps 23, 24, and t. divider p1 consisting of sections R11, R12, R13, and divider p2 consisting of sections R14, and R15.

One output terminal of generator S is connected through an acceleration control network Na to potentiometer section R15. This acceleration control network Na consists of an adjustable resistor R20 and capacitor C20, as indicated in Fig. 3. A high vacuum discharge tube V3 is with its anode a3 connected to positive direct current terminal 21 through resistor R22. Terminal 21 is supplied from rectifier and filter circuit N through resistor R21 which limits the current to a value consistent with the characteristics of voltage regulating tube Gr. The cathode k3 of tube V3 is connected to tap 24, between resistor sections R12 and R13 of divider p1. Tap 23 between divider sections R11 and R12 is connected to mid-point 25 of transformer secondary Ts1. The grid g3 of tube V3 is connected, through grid current limiting resistor R25, to the negative terminal of generator S.

It will be understood that the current for supplying the heating elements of the discharge tubes employed in this circuit will be derived from auxiliary secondaries of transformer T, which secondaries have not been indicated in Fig. 3 in order to simplify it.

The system according to Fig. 3 operates as follows.

The phase shifting and regulating circuits operate in the manner described above with reference to Fig. 2, with the difference that both half cycles series of the alternating-current wave supplied at A1 and A2 are utilized, due to the opposite directions of the conductivity paths of thyratrons G1 and G2, with regard to reactor secondary Ls. Accordingly, the parallel impedance branches of the network Np have oppositely arranged elements so that the respective 90° phase shift is in opposite sense as required by the opposite half waves of the supply voltage.

The control network Nc operates indirectly through the medium of high vacuum tube V3, whose conductivity decreases with increasing motor speed, or with appropriate shifting of tap t. Decreased conductivity of tube V3 decreases the voltage drop across load resistor R22, thus lowering the potential level of control electrodes g1 and g2 of the reactor thyratrons G1 and G2, thereby decreasing the energy passed through reactor L and hence decreasing the speed of motor M.

The application to the control network Nc of the control voltage supplied by generators S may be deferred by means of acceleration control network Na, whose time constant can be adjusted by means of capacitor C20 and resistor R20.

The speed at which motor M is maintained can be adjusted by shifting tap t in the manner above described with reference to Figs. 1, 2 and 4.

The operational characteristics of a system according to Fig. 3 are indicated in Figs. 5 and 6 as follows. The circuit can be so adjusted that, under normal load and at the desired speed of motor M, the thyratrons G1 and G2 fire at points corresponding to intersection F of Fig. 4, under which conditions reactor L admits an alternating-current wave of the shape indicated in Fig. 6 which shape, it will be noted, includes essentially the entire wave, thus assuring favorable operating conditions so far as utilization of the supplied energy and heating characteristic are concerned. With decreasing load, the firing point shifts towards the right hand side of Fig. 4, until, under substantially no load conditions, firing point D is reached. The comparatively unfavorable wave shape under idling conditions is practically harmless, and it will be observed that the wave shape becomes more favorable as the motor load increases.

A circuit built according to Fig. 3 for the control of a small repulsion motor included circuit elements having the following values.

| | |
|---|---|
| Motor M | ⅓ HP Repulsion Motor rated 7.5 amp., 115 volt at 2500 R. P. M. |
| Generator S | 2 volts at 100 R. P. M. |
| Tubes G1, G2 | type FG-17 |
| Tube V | type 6AG-5 |
| Tube Gr | type VR-150 |
| Reactor L | 7.45 KVA, 115 volt primary, 2×2125 volt secondary |
| Resistors R1 and R2 | 60,000 ohms |
| R3 and R4 | 40,000 ohms |
| R5 and R6 | 30 ohms |
| R11 | 14,000 ohms |
| R12 | 15,000 ohms |
| R13 | 600 ohms |
| R14 | 50,000 ohms |
| R15 | 10,000 ohms |
| R20 | 0.25 to 2.0 megohm |
| R21 | 50,000 ohms |
| R22 | 50,000 ohms |
| R25 | 0.5 megohm |

| | Microfarad |
|---|---|
| Capacitors C | 2 |
| C1, C2 | 0.05 |
| C5, C6 | 0.2 |
| C20 | 1.0 |

This arrangement permits speed control of its repulsion motor from practically zero to 4,000 R. P. M. with a change of the potentiometer voltage, by means of tap t, from approximately zero to 80 volts.

The control of the electron discharge device or devices for adjusting the series reactor in the motor supply circuit is above described as accomplished by way of shifting the potential level of the control voltage derived from the phase shifting circuit Np while its phase relation relatively to the supply circuit remains substantially unchanged during operation. An alternative arrangement will now be described with reference to Fig. 7 wherein, instead of adding the combined unidirectional control and regulation potentials to the alternating potential of the phase shifting network, the phase of that network is shifted for control purposes.

As indicated by similar identification marks, the circuit according to Fig. 7 is quite similar to that of Fig. 2 with the following exception. Instead of applying the control and regulating direct voltage directly to tube G, in series with that of the phase shifting network Np, the direct voltage is used to modify the phase of Np and hence the phase relation between the grid voltage of tube G and the line voltage. In the embodiment according to Fig. 7, this is accomplished by replacing resistor Rp of Fig. 2 with a high vacuum tube V4, whose anode a4 is connected to grid g of thyratron G, and whose input circuit with cathode k4 and grid g4 is connected to the output terminals of the control network Nc which, as in Fig. 2, includes generator S and auxiliary source b, p. The plate a4 of tube V4 is supplied with proper voltage in any manner conventional for this purpose.

The embodiment according to Fig. 7 operates as follows.

Small changes of the generator voltage correspondingly change the conductivity of tube V4, and hence the phase relation between line voltage and voltage on grid g of tube G and the impedance of reactor L. For example, if the motor load increases and the motor slows down thus decreasing the generator voltage, grid g4 becomes more positive relatively to its cathode g4 so that, with decreasing effective resistance of tube V4, the control voltage phase shift is decreased, with curve P of Fig. 4 moving towards the left and the current through G and Ls increased, which causes increased energy supply to and increased speed of the motor. The previous discussion of the relation between the regulation voltage derived from generator S and the control voltage derived at tap t applies also to the embodiment according to Fig. 7.

It should be understood that the present disclosure is for the purpose of illustration only and that this invention includes all modifications and equivalents which fall within the scope of the appended claims.

I claim:

1. Motor regulation system comprising an alternating-current motor, an alternating-current line for energizing said motor, a generator controlled by said motor to furnish a voltage continuously proportionate to the speed of the motor, electron discharge means having control electrode means for continuously varying the current in its output circuit, a source of variable direct-current voltage, a regulating circuit including in series said control electrode means, said generator, and said direct-current source, and a transformer having core means with winding means connected in series in said line and additional winding means connected in said output circuit.

2. A speed control system comprising an alternating-current source, an alternating-current motor having the characteristic of speed sensitive to input energy, said motor being connected to said source, a generator coupled to said motor continuously to produce a voltage proportional to the motor speed, an auxiliary adjustable source of voltage, a gaseous electron discharge device having a load circuit and a control circuit coupled to said source, a reactor having a primary winding in series with said motor and a secondary winding in the load circuit of said electron discharge device, and a network for connecting said generator and said adjustable source in opposition in said control circuit of said electron discharge device continuously to apply a unidirectional voltage thereto, whereby the duration of conduction of said discharge device over the cycle of said alternating-current source is varied to control the energy input to the motor and to maintain the motor speed substantially in proportion to said auxiliary voltage.

3. Motor regulation system comprising an alternating-current motor, an alternating-current supply line arranged for energizing said motor, a generator controlled by said motor continuously to furnish a voltage proportionate to the speed of the motor, a discharge device having anode, cathode and control electrode, reactor means including a primary in series in said line and a secondary coupled thereto, a control network associated with said electrode for continuously varying the conductivity of said discharge device as a function of said voltage at varying points of consecutive half cycles of said alternating-current, a control circuit including in series connection said control electrode, said control network, said generator, and said cathode, and a regulating circuit including in series connection said anode, said secondary and said cathode.

4. Motor regulation system comprising an alternating-current motor, an alternating-current supply line arranged for energizing said motor, a generator controlled by said motor continuously to furnish a voltage proportionate to the speed of the motor, a source of direct voltage, means for varying said voltage, a discharge device having anode, cathode and control electrode, reactor means including a primary in series in said line and secondary coupled thereto, a control network associated with said electrode for continuously varying the conductivity of said discharge device as a function of said voltage at varying points of consecutive half cycles of said alternating-current, a control circuit including in series connection said control electrode, said control network, said generator, said source and said cathode, and a regulating circuit including in series connection said anode, said secondary and said cathode.

5. Motor regulation system comprising an alternating-current motor, an alternating-current supply line arranged for energizing said motor, a tachometer generator coupled to said motor, a source of variable direct voltage, a gaseous discharge device having anode, cathode and control electrode, reactor means including a primary in series in said line and a secondary coupled thereto, a phase shifting network arranged to derive its frequency from said line, a control circuit including in series connection said electrode, said phase shifting network, said generator, said source and said cathode, and a regulating circuit including in series connection said anode, said secondary and said cathode.

6. Motor regulation system comprising an alternating-current motor; an alternating-current line supplying said motor; a generator controlled by said motor to furnish a voltage proportionate to the speed of the motor; reactor means having a primary connected in series in said supply line and a secondary inductively coupled thereto; a regulating network including said secondary, two gaseous discharge devices each having anode, cathode and control electrode, electric connections between one terminal of said secondary to one of said anodes, from the other terminal of said secondary to said other anode, and between said cathodes and the midpoint of said secondary; a phase shifting network including reactor means coupled to said line, two impedance units oppositely connected in parallel to said reactor means, and connections from said units to respective control electrodes of said discharge devices; and a control circuit including a source of direct voltage, a high vacuum discharge device having an anode connected to said cathodes and said secondary midpoint of said regulating network and to a positive supply point of said direct voltage source, a cathode connected to a negative supply point of said source, and a grid connected to a tap of said source in series through the output terminals of said tachometer generator, and a connection from the midpoint of said reactor means of said phase shifting network to said source; said phase shifting network being arranged for applying to said electrodes control voltages in approximately opposite phase with the supply current, said control circuit shifting the voltage of said electrodes under control of the voltage furnished by said generator, and said regulating network shunting said secondary under control of said electrodes during sections of the positive and negative alternating-current waves in said line.

7. Motor regulation system comprising an alternating-current motor; an alternating-current line supplying said motor; a generator controlled by said motor to furnish a voltage proportionate to the speed of the motor; reactor means having a primary connected in series in said supply line and a secondary inductively coupled thereto; a regulating network including said secondary, two gaseous discharge devices each having anode, cathode and control electrode, electric connections between one terminal of said secondary to one of said anodes, from the other terminal of said secondary to said other anode, and between said cathodes and the midpoint of said secondary; a phase shifting network including reactor means coupled to said line, two variable impedance units oppositely connected in parallel to said reactor means, and connections from said units to respective control electrodes of said discharge devices; a control circuit including a source of direct voltage having tap means for supplying an adjustable substantially constant control voltage, a high vacuum discharge device having an anode connected to said cathodes and said secondary midpoint of said regulating network and to a positive supply point of said direct voltage source, a cathode connected to a negative supply point of said source, and a grid connected to said tap means of said direct voltage source in series through the output terminals of said tachometer generator, and a connection from the midpoint of said reactor means of said phase shifting network to said source; said phase shifting network being arranged for applying to said electrodes control voltages in approximately opposite phase with said supply current, said control circuit shifting the voltage of said electrodes under control of the voltage furnished by said generator as arbitrarily affected by said tap means, and said regulating network shunting said secondary under control of said electrodes during sections of the positive and negative alternating-current waves in said line.

8. Motor regulation system comprising a repulsion motor; an alternating-current line supplying the field windings of said motor; a tachometer generator coupled to said motor; a transformer having a primary connected in series in said supply line and secondary coupled thereto; a regulating network including said secondary, two gaseous discharge devices each having anode, cathode and control electrode, electric connections between one terminal of said secondary to one of said anodes, from the other terminal of said secondary to said other anode, and between said cathodes and the midpoint of said secondary; a phase shifting network including the secondary of a transformer whose primary is supplied from said line, two impedance units each having in series variable resistor and capacitor means, said units being oppositely connected in parallel to said network transformer, and connections from points between said resistor and capacitor means of said impedance units to respective control electrodes of said discharge devices; a control circuit including a source of substantially constant direct voltage having tap means for deriving therefrom an adjustable voltage, a high vacuum discharge device having an anode connected to said cathodes and said secondary midpoint of said regulating network and to a positive supply point of said source, a cathode connected to a negative supply point of said source, and a grid connected to said tap means of said direct voltage source in series through the output terminals of said tachometer generator, and a connection from the midpoint of said secondary of said phase shifting network to said source; said phase shifting network being arranged for applying to said electrodes control voltages at approximately opposite phase with said supply current, said control circuit shifting the voltage of said electrodes under control of the voltage furnished by said generator as arbitrarily affected by said tap means, and said regulating network shunting said secondary under control of said electrodes during sections of the positive and negative alternating-current waves in said line.

9. A speed control system comprising an alternating-current motor having the characteristic of speed sensitive to input energy, a generator coupled to said motor to produce a voltage proportional to the motor speed, an auxiliary adjustable source of voltage, alternating current circuit completing means connected in the energy supplying circuit of said motor and including an electronic device having an anode, a cathode and a conductivity controlling electrode, the period of current flow through said anode determining the period of energy supply and hence the value of the alternating current furnished to said motor through said circuit completing means, and a network for timing the starting instant of anode current flow by continuously applying between said cathode and said electrode a unidirectional voltage determined by said generator voltage and said auxiliary voltage in opposition to control said electronic device, whereby the current flow to the motor may be interrupted during variable periods of consecutive cycles of alternating current supplied to the motor, so that the speed of the motor is maintained substantially in proportion to the auxiliary voltage.

10. Motor regulation system comprising an alternating-current motor, an alternating-current supply line for energizing said motor, alternating current circuit completing means connected in the energy supplying circuit of said motor and including an electronic device having an anode, a cathode and a conductivity controlling electrode, the period of current flow through said anode determining the period of energy supply and hence the value of the alternating current furnished to said motor through the circuit completing means, generating means controlled by said motor to furnish a voltage proportionate to the speed of the motor, a network for timing the starting instant of anode current flow by continuously applying between said cathode and said electrode a unidirectional voltage determined by the voltage of said generating means, and means for arbitrarily adjusting the rate of change of said unidirectional voltage to vary at a predetermined rate the alternating current energy supplied to said motor proportionate to its speed.

11. Motor regulation system comprising an alternating-current motor having the characteristic of speed sensitive to input energy, an alternating-current supply line arranged for energizing said motor, a tachometer generator coupled to said motor, a source of variable direct voltage, alternating current circuit completing means connected to control current flow in said supply line and including an electronic device having an anode, a cathode and a conductivity controlling electrode, the period of current flow through said anode determining the period of energy supply and hence the value of the alternating current furnished to said motor through the circuit completing means, a phase shifting network arranged to derive its frequency from said line, and a control circuit for timing the starting instant of anode current flow and including in series connection said electrode, said phase shifting network, said generator, said source and said cathode, whereby the current flow to the motor may be interrupted during variable periods of consecutive cycles of alternating current supplied to the motor.

12. Motor regulation system comprising an alternating-current motor having the characteristic of speed sensitive to input energy, an alternating-current supply line arranged for energizing said motor, a tachometer generator coupled to said motor, a source of variable direct voltage, alternating current circuit completing means connected to control current flow in said supply line and including an electronic device having an anode, a cathode and a conductivity controlling electrode, the period of current flow through said anode determining the period of energy supply and hence the value of the alternating current furnished to said motor through the circuit completing means, a vacuum tube having an anode circuit containing a load impedance connected to the cathode of said electronic device to change its potential upon variation of current in the anode circuit and a control electrode circuit containing said generator and said source, and connections for timing the starting instant of anode current flow in said electronic device by applying a potential derived from said line to said electrode of said electronic device, whereby the current flow to the motor may be interrupted during variable periods of consecutive cycles of alternating current supplied to the motor.

WILLIAM N. TUTTLE.

REFERENCES CITED

The following references are of record in the file of this patent:

UNITED STATES PATENTS

| Number | Name | Date |
| --- | --- | --- |
| 1,376,453 | Meyer | May 3, 1921 |
| 1,695,035 | Stoller | Dec. 11, 1928 |
| 1,944,756 | Quarles | Jan. 23, 1934 |
| 1,963,246 | Purington | June 19, 1934 |
| 2,102,911 | Perry | Dec. 21, 1937 |
| 2,175,009 | Anderson | Oct. 3, 1939 |
| 2,229,448 | Garman | Jan. 21, 1941 |
| 2,287,459 | Uehling | June 23, 1942 |
| 2,421,632 | Livingston | June 2, 1947 |
| 2,448,256 | Elliot | Aug. 31, 1948 |
| 2,462,751 | Koehler | Feb. 22, 1949 |